United States Patent [19]

Miyazaki et al.

[11] Patent Number: 5,071,616
[45] Date of Patent: Dec. 10, 1991

[54] METHOD OF INSERTING RIGID PLASTIC LINING TUBE THROUGH PIPE

[75] Inventors: Yasuo Miyazaki, Osaka; Akira Kamide, Higashiosaka; Yoshiaki Saito, Nara, all of Japan

[73] Assignee: Osaka Bosui Construction Co., Ltd., Osaka, Japan

[21] Appl. No.: 629,189

[22] Filed: Dec. 18, 1990

Related U.S. Application Data

[63] Continuation of Ser. No. 360,924 filed as PCT/JP88/00687, Jul. 8, 1988, abandoned.

[30] Foreign Application Priority Data

Jul. 13, 1987 [JP] Japan .................. 62-174313
Feb. 5, 1988 [JP] Japan .................. 63-262777

[51] Int. Cl.⁵ .................. B29C 49/26; B29C 63/20
[52] U.S. Cl. .................. 264/516; 156/287; 156/294; 264/564; 264/573; 264/269
[58] Field of Search .......... 264/36, 269, 270, 516, 264/573, 295, 230, 249, 563, 564, DIG. 14; 156/287, 294, 293, 95; 138/97, 98; 242/55.2

[56] References Cited

U.S. PATENT DOCUMENTS

| 2,794,758 | 6/1957 | Harper et al. ............ 156/287 |
| 2,936,491 | 5/1960 | Hamlin .................... 264/230 |
| 3,523,356 | 8/1970 | Graf ....................... 264/249 |
| 3,927,164 | 12/1975 | Shimabukaro ............ 264/295 |
| 4,581,247 | 4/1986 | Wood ...................... 156/294 |
| 4,867,921 | 9/1989 | Steketee, Jr. ............. 264/36 |

FOREIGN PATENT DOCUMENTS

| 55-39362 | 3/1980 | Japan .................. 156/294 |
| 57-178828 | 11/1982 | Japan . |
| 5688281 | 5/1983 | Japan . |
| 59-89884 | 5/1984 | Japan . |
| 61-283531 | 12/1986 | Japan .................. 156/287 |
| 62-60633 | 3/1987 | Japan .................. 156/287 |
| 87-03840 | 7/1987 | PCT Int'l Appl. . |
| 87/05376 | 11/1987 | PCT Int'l Appl. .......... 264/269 |

Primary Examiner—Jan H. Silbaugh
Assistant Examiner—Mathieu Vargot
Attorney, Agent, or Firm—Armstrong, Nikaido, Marmelstein, Kubovcik, & Murray

[57] ABSTRACT

In inserting a rigid plastic tube through a pipe while paying out the tube from a drum having the tube wound thereon in a flat form, a heating fluid is supplied into the plastic tube to pass the fluid from its one end toward the other end thereof and thereby heat and soften the plastic tube over the entire inner peripheral surface of the tube. The plastic tube as wound on the drum can be heated and softened uniformly at every portion over the entire length thereof and can further be held so softened also during the insertion of the tube through the pipe. The tube can be easily passed through an intermediate bent pipe portion, if any, and efficiently inserted through the pipe.

9 Claims, 10 Drawing Sheets

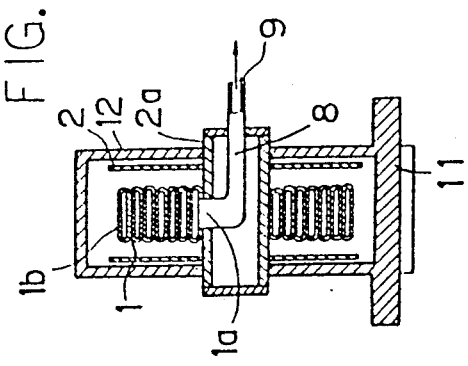
FIG.2-a
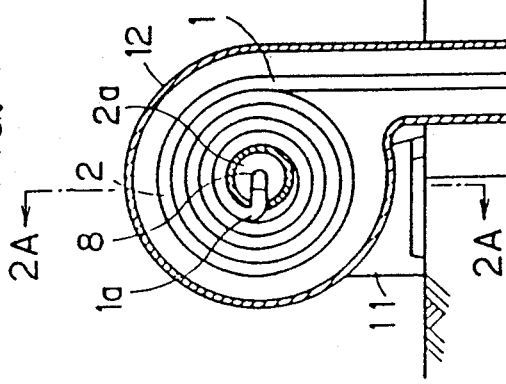
FIG.2
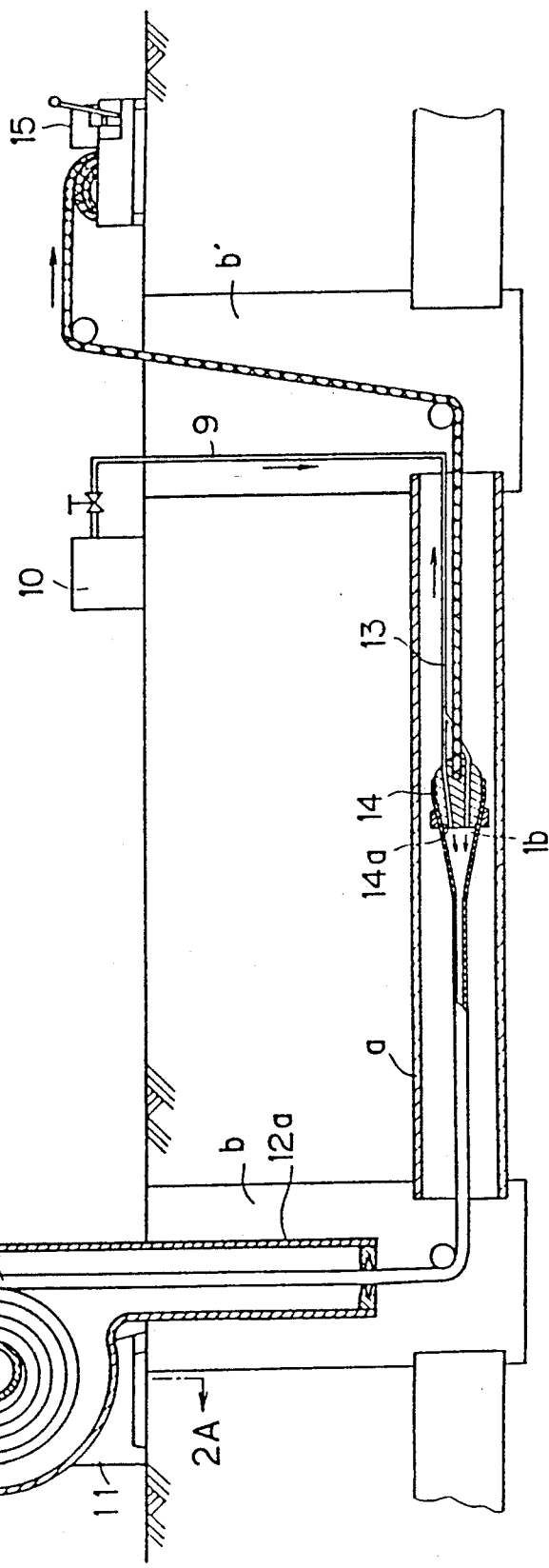

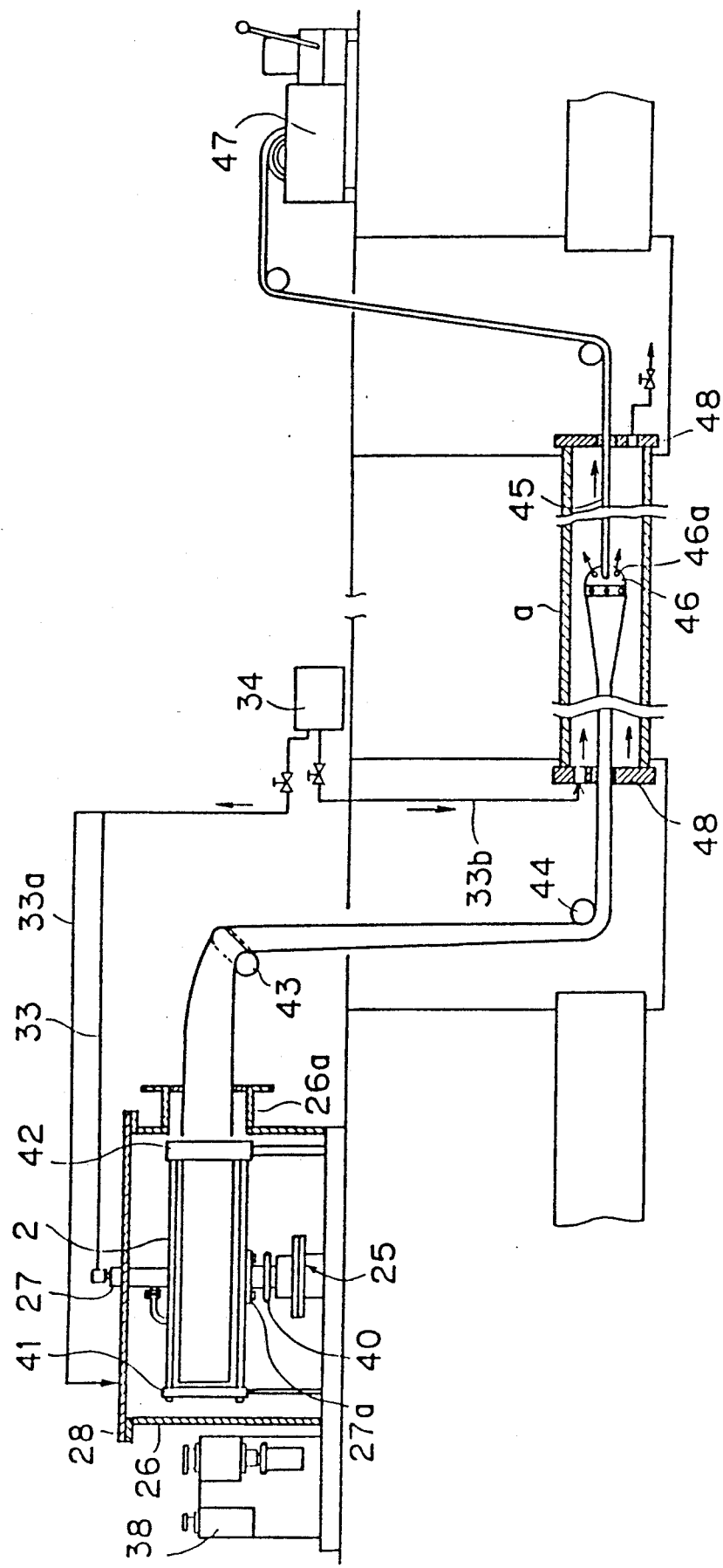

METHOD OF INSERTING RIGID PLASTIC LINING TUBE THROUGH PIPE

This application is a continuation of application Ser. No. 360,924, filed as PCT/JP88/00687, Jul. 8, 1988, now abandoned.

TECHNICAL FIELD

The present invention relates to a method of inserting a rigid plastic lining tube through pipes, and more particularly to a method of inserting a rigid plastic tube through a pipe to line the pipe with the rigid plastic tube.

BACKGROUND ART

Methods of lining pipes with a rigid plastic tube have already been proposed wherein the plastic tube is inserted through the pipe and thereafter inflated radially of the pipe by applying heat and pressure to the tube from inside to cover the inner surface of the pipe with the tube. The lining formed by the proposed method is made of the inflated rigid plastic tube and therefore has shape retentivity, high strength and a high quality.

Although the pipe lining work differs with the type of pipe, the work is performed for a length of pipe which is usually about 10 to about 100 m as single span. The rigid plastic tube serving as the lining material has a considerably large length longer than one span of pipe, so that the tube can be transported to the work site conveniently when it is wound on a drum. The rigid plastic tube can be wound on the drum when collapsed radially thereof from the form having a circular cross section to a flat form and made flexible by being softened with heating.

To pay out the plastic tube from the drum, there arises a need to heat and soften the tube at the work site as when it was wound on the drum. However, since the plastic tube wound on the drum is in the form of layers of a flat tube, it is difficult to directly heat the layers. Further because plastic materials generally have low heat conductivity, the layers of tube can not be heated effectively through heat conduction. Accordingly, even if the tube winding on the drum is heated, the outermost layer may be softened but the underlying layers remain unsoftened, with the result that the plastic tube can not be smoothly paid out from the drum and inserted into the contemplated pipe and thereby entails a low work efficiency.

When inserted into the pipe, the plastic tube gradually releases heat, becomes rigid again and substantially loses flexibility, so that another problem arises in that the tube can not be passed through an intermediate bend or like portion of the pipe.

DISCLOSURE OF THE INVENTION

An object of the present invention is to provide a method of smoothly and efficiently inserting a rigid plastic tube through a pipe by heating and softening the tube uniformly over the entire length thereof as wound on a drum and paying out the tube from the drum.

Another object of the invention is to provide a method of inserting a rigid plastic tube through a pipe while holding the tube softened by heating until the tube has been completely inserted through the pipe so that the tube can be easily passed through an intermediate bend of the pipe.

Other features of the invention will become apparent from the following description.

The present invention provides a method of inserting a rigid plastic tube through a pipe while paying out the tube from a drum having the tube wound thereon in a flat form, the method being characterized by supplying a heating fluid into the plastic tube to pass the fluid from its one end toward the other end thereof and thereby heat and soften the plastic tube over the entire inner peripheral surface of the tube.

With the method of the invention, the rigid plastic tube wound on a drum is heated with a heating fluid over the entire inner peripheral surface thereof, is therefore uniformly softened at every portion over its entire length and can consequently be paid out from the drum and inserted through the pipe smoothly and efficiently.

Since the heating fluid is supplied into the rigid plastic tube from its one end toward the other end thereof, the fluid can be so supplied continuously also during the insertion of the tube through the pipe, thereby holding the plastic tube softened with good stability properly until the tube is completely inserted through the pipe. Accordingly, the plastic tube can be easily passed through an intermediate bent pipe portion, if any.

With the present method, the heating fluid may be supplied to the interior of the plastic tube through a perforated hose inserted through the tube over the entire length thereof in advance. The perforated hose functions to distribute the heating fluid uniformly to every portion of the tube over the entire length thereof when supplying the fluid and is therefore useful especially when the plastic tube has a relatively large length.

According to the method of the invention, the rigid plastic tube may be heated with the heating fluid also from outside thereof in addition to the heating with the fluid from inside. Heating the tube with the fluid from both inside and outside is useful especially when the tube has a relatively large wall thickness.

The rigid plastic tube to be inserted by the method of the invention is one made of a thermoplastic synthetic resin, such as polyvinyl chloride, polyethylene or polypropylene, which has a softening point of up to 100° C. and which can be softened by heating with the heating fluid. The rigid plastic tube is circular in cross section, has an outside diameter corresponding to about 50 to 90% of the inside diameter of the pipe, and is collapsed radially thereof to a flat tubular form when wound onto a drum.

The fluid for heating and softening the rigid plastic tube is most suitably steam because of its great heat capacity but can alternatively be heated air, heated water or the like.

The heating fluid may be supplied to the plastic tube from the tube end at the innermost layer of the tube winding on the drum toward the other tube end at the outermost layer thereof, or in the reverse direction.

At the work site, the drum is installed either in a vertical position or in a horizontal position. The horizontal position is more favorable than the vertical position when steam is used as the heating fluid because the steam channel through the plastic tube continuously extends spirally in a plane and is free of the likelihood of the drain blocking the channel and further because the plastic tube as softened by heating is prevented from hanging down by the drum side plate.

BRIEF DESCRIPTION OF THE DRAWINGS

FIG. 1A is a diagram in vertical section taken along the line 1A—1A in FIG. 1;

FIG. 2 is an overall diagram showing a modification of FIG. 1;

FIG. 2A is a diagram in section taken along the line 2A—2A in FIG. 2;

FIG. 13 is an overall view similar to FIG. 8 and showing supply of steam into a pipe.

BEST MODE OF CARRYING OUT THE INVENTION

Various modes of practicing the method of the invention will be described below with reference to the accompanying drawings.

Figure 1:
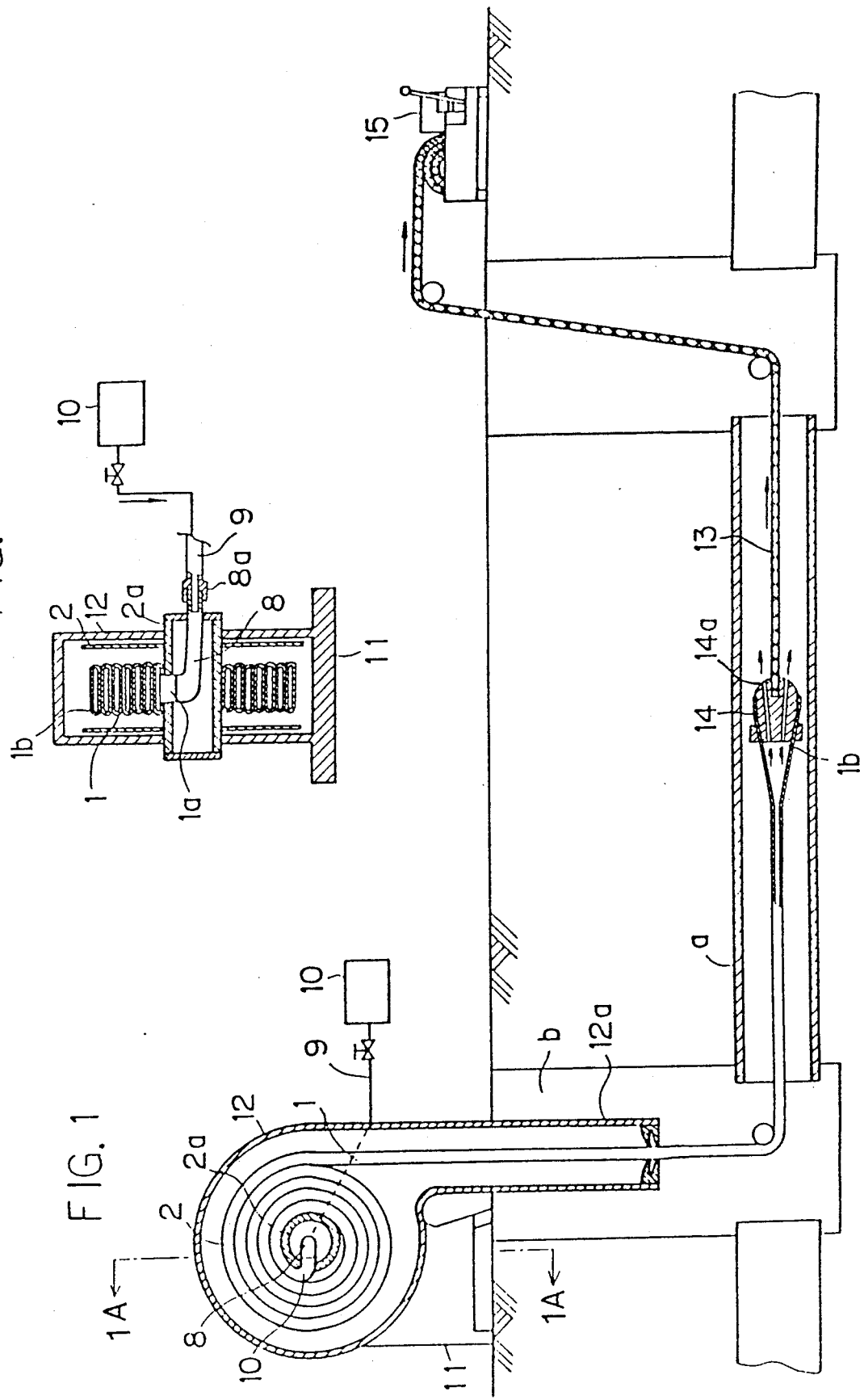
FIG. 1 is an overall diagram schematically showing the method of the invention as it is being practiced with a drum installed in a vertical position.

FIGS. 1 and 1A show one mode of practicing the method of the invention with a drum installed in a vertical position.

Figure 5:
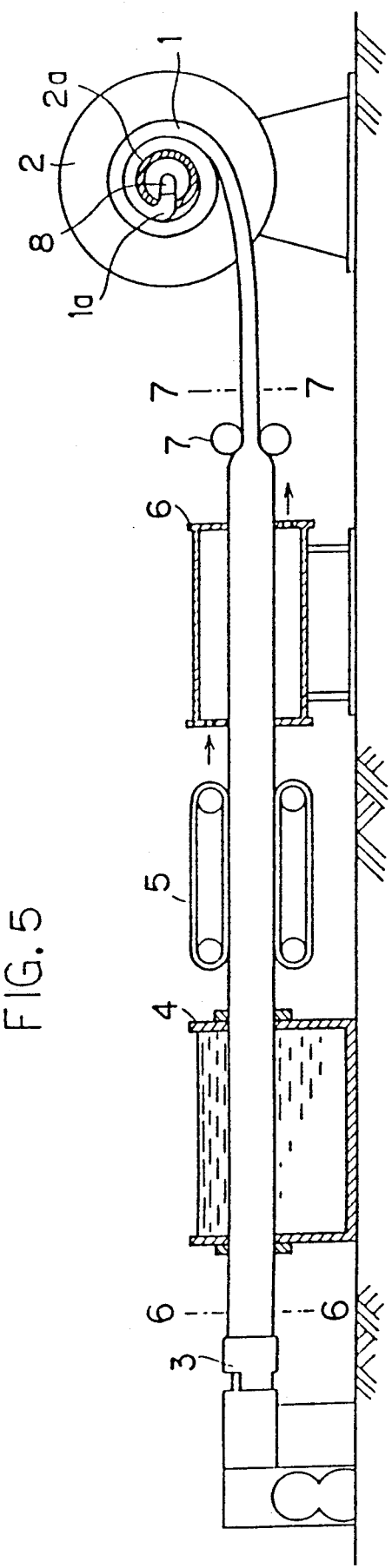
FIG. 5 is an overall diagram schematically showing a rigid plastic tube as it is being wound on the drum.
Figure 7:
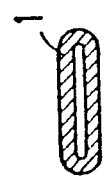
FIG. 7 is a view in section taken along the line 7—7 in FIG. 5.
Figure 6:
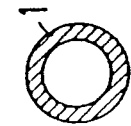
FIG. 6 is a view in section taken along the line 6—6 in FIG. 5.

With reference to FIG. 5, a rigid plastic tube 1 shaped to circular form in cross section (see FIG. 6), for example, by an extruder 3 is passed through a cooling bath 4, transport device 5 and heater 6, then deformed to a flat tubular form (see FIG. 7) by work rolls 7 and thereafter wound onto a drum 2 so as to be transportable to a work site with ease. For example, steam is used as the heat source for the heater 6. The work rolls 7 can be provided with a heater (not shown) for maintaining the rolls 7 at a predetermined temperature.

Before the plastic tube 1 is wound on the drum 2, the forward tube end 1a to be positioned at the innermost layer of the winding to be formed is inserted into a hollow spool 2a at the center of the drum 2 and connected to one end of a steam supply pipe 8 inserted in and fixed to the spool 2a. As seen in FIG. 1A, the steam supply pipe 8 has at the other end thereof a swivel joint 8a, at which the supply pipe 8 is suitably connectable to a steam supply source such as a boiler 10 via a steam conduit 9.

The plastic tube 1 is wound on the drum 2 with its innermost end 1a thus connected to one end of the steam supply pipe 8 and is transported to the work site as wound on the drum 2.

As shown in FIGS. 1 and 1A, the drum 2 transported to the work site is mounted in a vertical position on a support frame 11 and housed in this state in a heat insulating casing 12. The support frame 11 is installed close to one of two work pits b excavated at the respective ends of a span of pipe a.

To heat and soften the plastic tube 1 as supported in the state shown in FIGS. 1 and 1A, a heating fluid, e.g., steam, is supplied from the boiler 10 to the interior of the plastic tube 1 via the conduit 9, swivel joint 8a, supply pipe 8 and the innermost tube end 1a connected to one end of the supply pipe 8 as seen in FIG. 1A.

The steam supplied to the plastic tube 1 flows through the tube 1 from the tube end 1a toward the other tube end 1b at the outermost layer of the winding (see FIG. 1A) and in the meantime heats the plastic tube 1 from inside over the entire inner peripheral surface thereof as the surface to be heated. The plastic tube 1 as wound on the drum 2 can be uniformly softened at every portion over the entire length thereof by being held thus heated with steam for a period of time.

When heated and softened at every portion over the entire length, the plastic tube 1 becomes flexible and made ready for paying out from the drum 2 and insertion into the pipe a.

When to be inserted into the pipe a, the plastic tube 1 softened by heating is withdrawn from the heat insulating casing 12 through a duct 12a thereof and connected to one end of a rope 13 already inserted through the pipe a by a connector 14 having steam ejection bores 14a. The plastic tube 1 connected to the rope 13 can be inserted into the pipe a by operating a winch 15 and thereby winding up the rope 13 as shown in FIG. 1.

The supply of steam into the tube 1 is continued during the insertion of the tube 1 into the pipe a, whereby the tube 1 is held softened also during the insertion and can be easily passed through an intermediate bent pipe portion, if any (not shown).

To form a rigid lining layer, the rigid plastic tube 1 inserted through the pipe a is subjected to heat and pressure from inside in the usual manner and thereby inflated radially thereof.

FIGS. 2 and 2A show a case wherein steam is supplied into the rigid plastic tube 1 from the outermost tube end 1b toward the innermost tube end 1a unlike the case shown in FIGS. 1 and 1A. In this case, the boiler 10 is installed close to the other work pit b', and the conduit 9 for supplying steam from the boiler 10 extends through the pipe a and is connected to the outermost tube end 1b. The supply pipe 8 connected to the innermost tube end 1a is utilized as a steam outlet. With the exception of the above arrangement, the present embodiment is substantially the same as the embodiment shown in FIGS. 1 and 1A.

Figure 3:
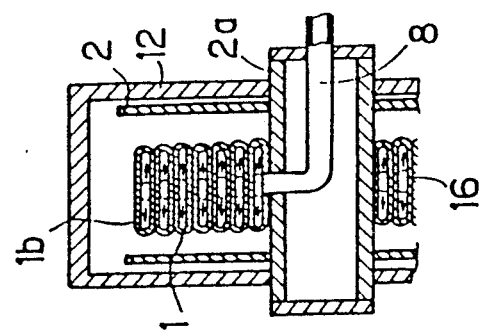
FIG. 3 is a diagram in vertical section similar to FIG. 1A or 2A and showing a perforated hose as used for supplying steam.

With reference to a fragmentary enlarged view of FIG. 3, the plastic tube 1 for use in the method of the invention may have inserted therethrough a perforated hose 16 made of heat-resistant rubber and having a multiplicity of holes for supplying steam to the interior of the tube 1 through the hose 16. The perforated hose 16 then serves to uniformly distribute the steam over the entire length of the plastic tube 1 and is especially useful when the tube 1 has a large length, for example, of about 50 to about 100 m. When the perforated hose 16 is to be used for supplying steam as distributed, one end of the hose 16, instead of the innermost end 1a of the tube 1, is connected to the steam supply pipe 8.

Figure 4:
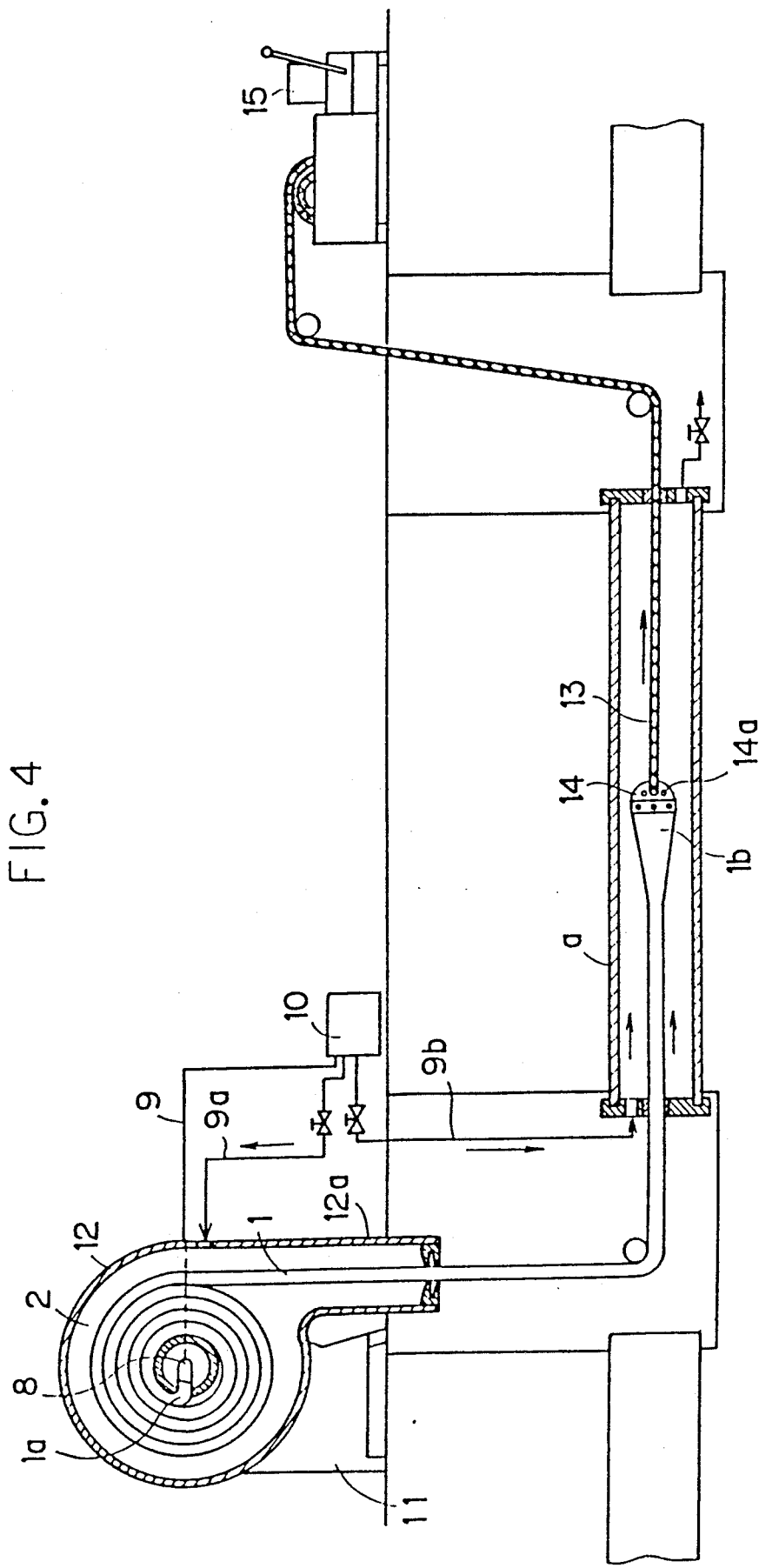
FIG. 4 is an overall diagram in vertical section corresponding t FIG. 1 and showing supply of steam into a pipe.

When the rigid plastic tube 1 to be used has a relatively large wall thickness, for example, of about 3 to about 10 mm in order to form a lining of increased wall thickness, steam is supplied from the boiler 10 into the heat insulating casing 12 and the pipe a via conduits 9a, 9b, respectively, for heating the tube 1 with the steam from outside in addition to heating from inside as seen in FIG. 4 showing a modification of FIG. 1.

Figure 8:
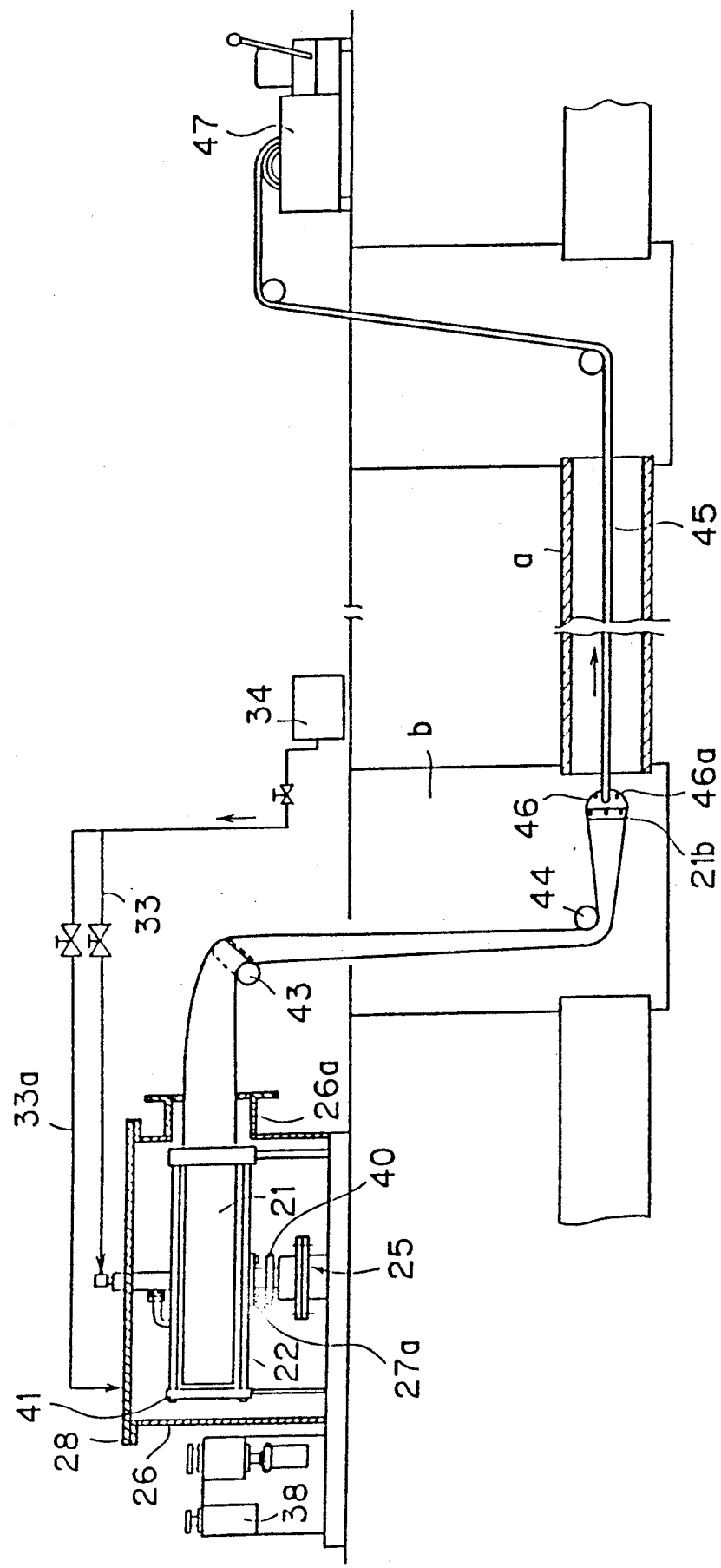
FIG. 8 is an overall diagram schematically showing the method of the invention as it is being practiced with a drum installed in a horizontal position.

FIG. 8 shows another mode of practicing the method of the invention, in which a drum is installed in a horizontal position.

Figure 9:
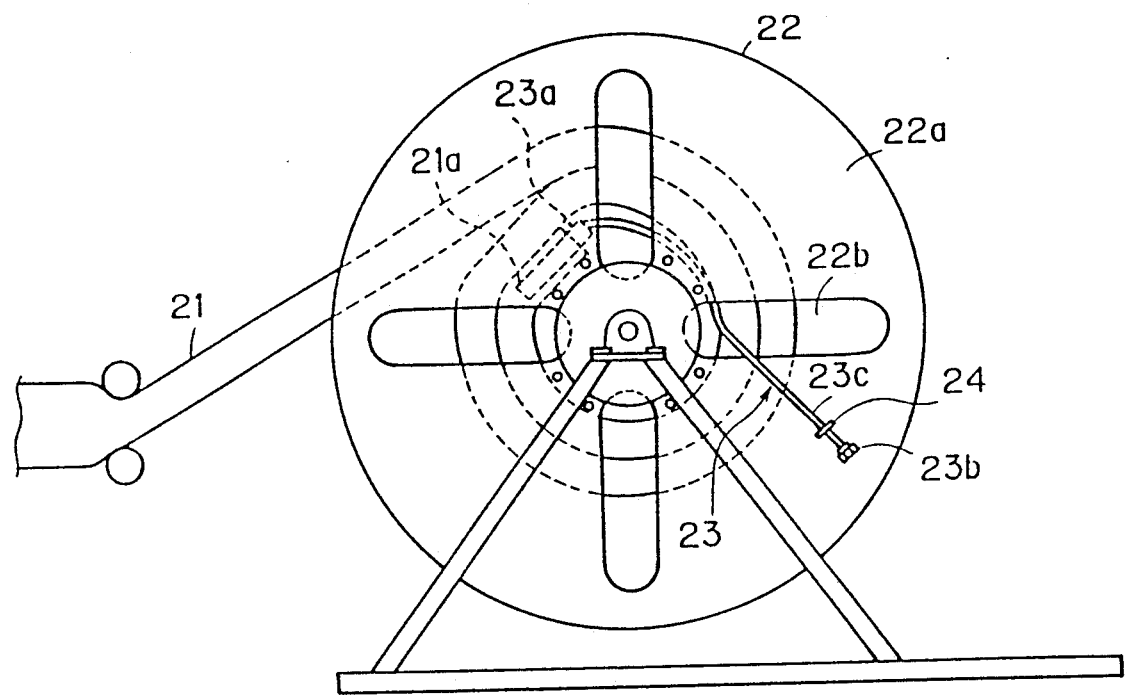
FIG. 9 is an enlarged side elevation showing a rigid plastic tube as it is being wound onto the drum with steam supply means attached to one end of the tube at the innermost layer of the tube winding.

As shown in FIG. 9, to supply steam to the interior of a rigid plastic tube 21 from one end 21a thereof in this embodiment, a steam supply member 23 is attached to the tube 21 when the tube is to be wound on the drum 22. The supply member 23 comprises a mouthpiece 23a attached to the tube end 21a at the innermost layer of the winding of tube 21 to be formed, another mouthpiece 23b fixed to the outer side of a drum side plate 22a with a fastener 24, and a heat-resistant rubber hose 23c interconnecting the two mouth-pieces 23a, 23b. The rubber hose 23c extends into the drum 22 from outside through an aperture 22b formed in the drum side plate 22a.

The rigid plastic tube 21 is transported to the work site, as wound on the drum 22 and connected to the steam supply member 23. The drum 22 is mounted in a horizontal position on a support device 25 at the work site.

Figure 10:
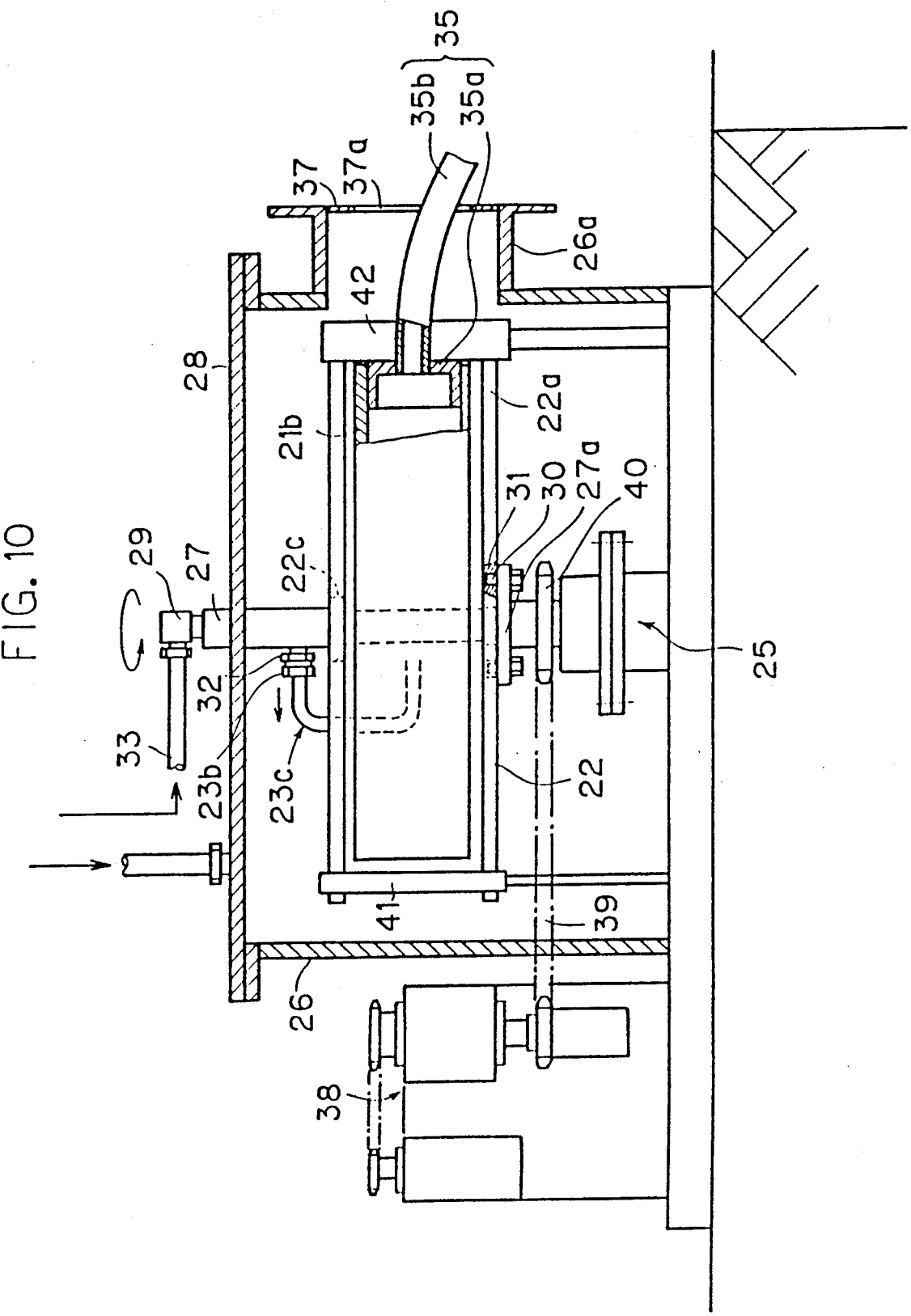
FIG. 10 is an enlarged view partly in vertical section and showing the drum as installed in the horizontal position.

As shown in greater detail in FIG. 10, the support device 25 having the drum 22 supported thereon in the horizontal position at the work site comprises a heat insulating casing 26 for housing the drum 22, and a hollow rotary shaft 27 for supporting the drum 22 in the horizontal position. The shaft 27 extends upward through an upper closure 28 of the casing 26 and carries a swivel joint 29 at its upper end outside the casing 26.

The drum 22 is mounted on the rotary shaft 27 with the upper closure 28 removed from the casing 26. The drum 22 is fitted around the shaft 27 at center mount holes 22c formed in its side plates 22a and bears on a flange 27a fixed to the shaft 27. The flange 27a has a plurality of upwardly projecting pins 30 arranged along its periphery and fitting in pin holes 31 formed in the lower side plate 22a of the drum 22, whereby the drum 22 is connected to the rotary shaft 27 and made rotatable therewith. The mouthpiece 23b positioned outside the upper side plate 22a of the drum 22 is attached to an opening joint 32 at an upper portion of the rotary shaft 27.

After the drum 22 has been installed in the horizontal position, the upper closure 28 is attached to the casing 26. The hollow portion of the rotary shaft 27 is caused to communicate with steam supply source, e.g., a boiler 23 (see FIG. 8), through the swivel joint 29 at the shaft upper end and a conduit 33 connected to the joint, whereby the plastic tube 21 is made ready for softening by heating. The other end 21b of the plastic tube 21 at the outermost layer of its winding has attached thereto a withdrawing member 35 for withdrawing the tube 21 through an outlet duct 26a of the casing 26 after the tube 21 has been softened by heating. The withdrawing member 35 comprises a tubular spigot 35a fitted in and jointed to the other tube end 21b, and rubber hose 35b extending from the spigot 35a to the outside of the casing through the duct 26a. The withdrawing member 35 also provides a discharge outlet for the steam flowing through the tube 21.

When steam is supplied from the boiler 34 (see FIG. 8) in the state shown in FIG. 10, the steam flows into the plastic tube 21 via the conduit 33, joint 29, rotary shaft 27, opening joint 32, mouthpiece 23b, hose 23c, mouthpiece 23a (see FIG. 9) and innermost tube end 21a, then flows toward the other tube 21b while heating the tube 21 from inside and is finally discharged from the tube 21 through the withdrawing member 35 attached to the other tube end 21b.

Figure 12:
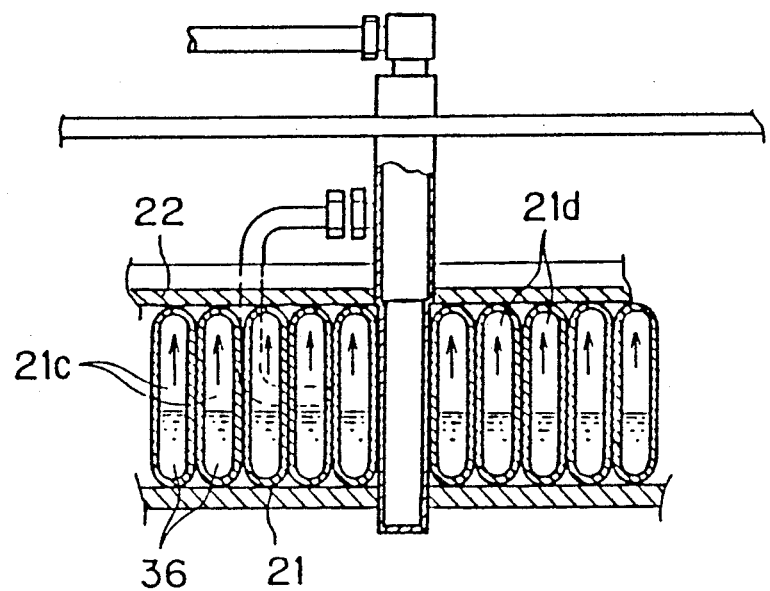
FIG. 12 is a fragmentary sectional view showing a steam channel as formed inside the rigid plastic tube.

As shown in FIG. 12, the plastic tube 21 is thus heated with the steam from inside with the drum 22 installed in the horizontal position, i.e., with the inside channel 21c of the plastic tube 21 continuously extending spirally in a horizontal plane over the entire length of the tube 21, with the result that the drain 36 produced on condensation of the steam collects in the lower portion of the channel 21c substantially uniformly over the entire tube length. Consequently, a steam flow channel 21d is formed in the upper portion of the channel 21c over the entire length. Despite the formation of the drain, therefore, the plastic tube 21 can be heated by steam from inside uniformly over the entire length.

The procedure for internally heating the plastic tube 21 with steam may be executed while holding a hot atmosphere within the casing 26 by supplying steam from the boiler 34 into the casing 26 through the duct 33 and a branch duct 33a as seen in FIG. 8. When the steam-heated hot atmosphere is to be maintained inside the casing 26, it is desirable to seal the outlet duct 26a with a seal member permitting withdrawal of the plastic tube 21, such as a rubber film 37 formed with a slit 37a for withdrawing the tube 21 therethrough as shown in FIG. 10.

Figure 11:
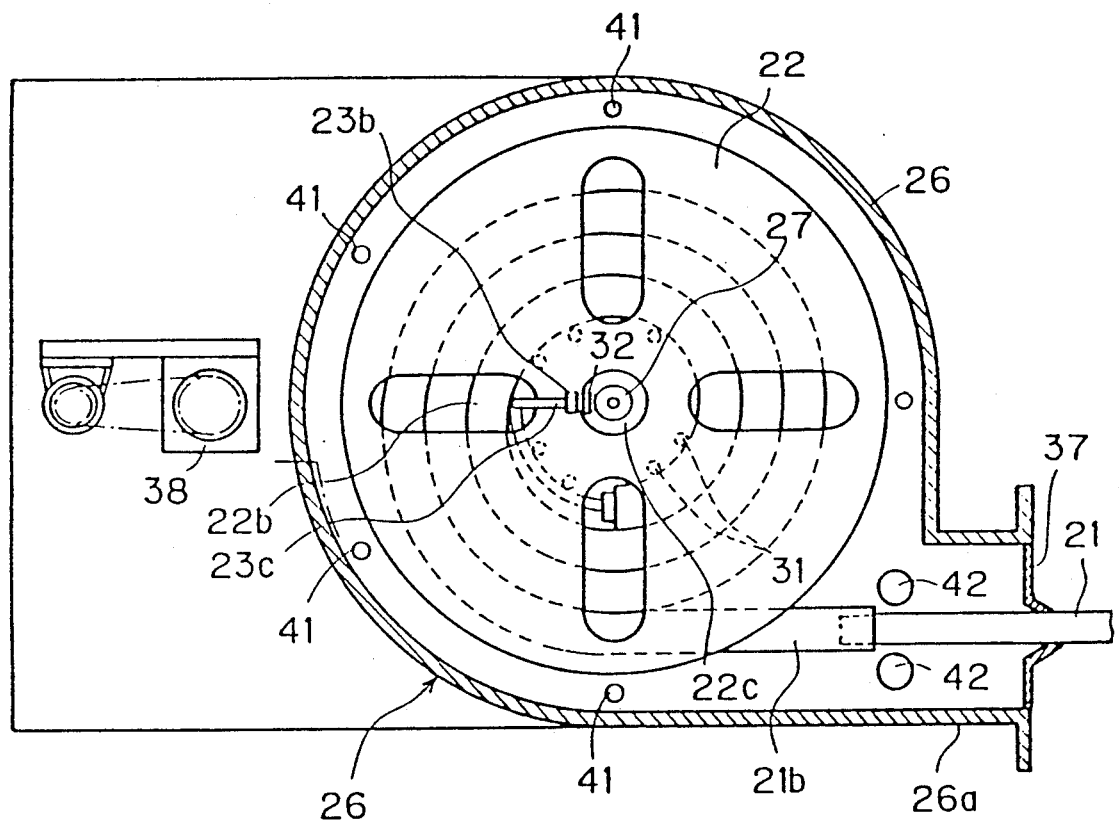
FIG. 11 is a plan view of FIG. 10 with an upper closure removed.

When heated with the steam from inside, the plastic tube 21 is softened, becomes flexible and can be paid out from the drum 22 because it is in the form of a flat tube. In the state shown in FIG. 8, therefore, the tube 21 is withdrawn outside from the casing 26 through the outlet duct 26a as being led out by the withdrawing member 35. For example to rewind the plastic tube 21 on the drum, the drum 22 is made suitably rotatable by a drive unit 38 through a chain 39 and a sprocket 40. When to be paid out, the plastic tube 21 is prevented from falling off the drum 22 by rollers 41 (see FIG. 11) arranged along the periphery of the drum 22 and is further guided toward the duct 26a by a pair of guide rollers 42, 42 disposed close to the inlet of the duct 26a.

As shown in FIG. 8, the plastic tube 21 withdrawn from the outlet duct 26a of the casing 26 in the flat form is initially in vertical position, is inclined through 45 degrees by the time it reaches an upper guide roller 43 disposed above the work pit b and is further inclined through 45 degrees to a horizontal position by the time it reaches a lower guide roller 44 disposed in the lower portion of the pit b. In this horizontal position, the tube 21 is attached to a connector 46 at one end of a pulling rope 45 which is inserted through the pipe a in advance. The other end of the rope 45 is wound on a winch 47 installed on the ground. The connector 46 is formed with steam ejection bores 46a, through which steam is ejected to flow through the pipe 21.

In the state shown in FIG. 8, the winch 47 is operated to draw the plastic tube 21 into the pipe a, whereby the tube 21 is inserted through the entire length of the pipe a.

When the plastic tube 21 is to be inserted through the pipe a, steam may be supplied into the pipe a from the boiler 34 through a conduit 33b, with closures 48, 48 provided at the respective ends of the pipe a as seen in FIG. 13. The supply of steam into the pipe a is useful for preventing the outer surface portion of the plastic tube 21 from hardening within the pipe a especially during the severe cold season or in a cold climate. For the same purpose, a heat insulating duct (not shown) may be provided between the outlet duct 26 and the lower guide roller 44.

Steam is passed through the plastic tube 21 also during the insertion of the tube through the pipe a to hold the plastic tube 21 flexible also within the pipe a, permitting the tube 21 to easily pass through an intermediate bent pipe portion, if any, as in the foregoing embodiment.

We claim:

1. A method of inserting a rigid plastic tube through a pipe while paying out the plastic tube from a drum having the plastic tube wound thereon in a flat form, comprising the steps of:
    softening the plastic tube;
    winding the plastic tube about the drum such that the plastic tube is flattened;
    disposing the drum such that windings formed by the flattened plastic tube are wound about a vertical central axis of the drum;
    supplying a heating fluid in a vapor form into one end of the plastic tube to cause passage of the heating fluid from said end toward the other end of the plastic tube so as to heat and soften the plastic tube over the entire inner peripheral surface of the plastic tube, such that a condensed portion of said heating fluid collects in a lower portion of said plastic tube and does not block passage of a vapor portion of said heating fluid through the plastic tube, thereby ensuring heating of the plastic tube along its entire length;
    paying out the softened plastic tube while inflating it due to pressure of the heating fluid; and
    cooling the plastic tube within the pipe until it is rigid.

2. A method as defined in claim 1 wherein the heating fluid is supplied into the rigid plastic tube from its one end at an innermost layer of the tube winding toward the other end thereof at an outermost layer of the tube winding.

3. A method as defined in claim 1 wherein the heating fluid is supplied into the rigid plastic tube from its one end at an outermost layer of the tube winding toward the other end thereof at an innermost layer of the tube winding.

4. A method as defined in claim 1 wherein the heating fluid is steam.

5. A method as defined by claim 1 and further comprising: inserting a perforated hose internally through the entire length of said rigid plastic tube prior to winding said tube on said drum and said heating fluid is supplied into said plastic tube through said perforated hose.

6. A method as defined by claim 1 and further comprising: installing said drum within a heat insulating casing, and supplying a heating fluid into the casing to heat an external surface of the rigid plastic tube wound on the drum.

7. A method as defined in claim 1 and further comprising: supplying a heating fluid to the pipe to heat the external surface of the rigid plastic tube as the rigid plastic tube is inserted through the pipe.

8. A method of inserting a rigid plastic tube through a pipe while paying out the plastic tube from a drum having the plastic tube wound thereon in a flat form, comprising the steps of:
    inserting a perforated hose in the plastic tube prior to winding of the plastic tube about the drum;
    softening the plastic tube;
    concurrently winding the perforated hose and the softened plastic tube about the drum so that the plastic tube is wound in a flattened form;
    cooling the plastic tube until the plastic tube is rigid;
    supplying a heating fluid into one end of the perforated hose to cause passage of the heating fluid from said one end of the perforated hose toward the other end of the perforated hose such that the heating fluid flows through the perforations in the perforated hose to heat and soften the plastic tube over substantially the entire inner peripheral surface of the plastic tube; and
    concurrently paying out the softened plastic tube and the perforated hose from the drum while inflating the tube; and
    cooling the plastic tube within the pipe until it is rigid.

9. A method as defined in claim 8 wherein the drum is installed in a vertical position at a work site.

* * * * *

UNITED STATES PATENT AND TRADEMARK OFFICE
CERTIFICATE OF CORRECTION

PATENT NO. : 5,071,616
DATED : December 10, 1991
INVENTOR(S) : Yasuo MIYAZAKI et al It is certified that error appears in the above-identified patent and that said Letters Patent is hereby corrected as shown below:

On Title page, Item [30], second line, "63-262777" should read -- 63-26277 --.

Signed and Sealed this

Twenty-second Day of June, 1993

Attest:

MICHAEL K. KIRK

*Attesting Officer*    Acting Commissioner of Patents and Trademarks